United States Patent [19]

Slicker et al.

[11] Patent Number: 4,766,967
[45] Date of Patent: Aug. 30, 1988

[54] OSCILLATION CONTROL SYSTEM FOR ELECTRIC MOTOR DRIVE

[75] Inventors: James M. Slicker; Ahmad Sereshteh, both of Union Lake, Mich.

[73] Assignee: Eaton Corporation, Cleveland, Ohio

[21] Appl. No.: 813,832

[22] Filed: Dec. 27, 1985

[51] Int. Cl.⁴ .............................................. B60K 1/00
[52] U.S. Cl. ................................... 180/54.1; 180/65.8
[58] Field of Search .................... 180/65.1, 65.8, 54.1; 364/426; 123/361

[56] References Cited

U.S. PATENT DOCUMENTS 3,297,926  1/1967  Campbell et al. .................. 180/65.8

OTHER PUBLICATIONS

Computer Controlled Systems, Theory and Design; Karl J. Aström et al.; Prentice-Hall Information and System Sciences Series (1984), Chapter 9, pp. 216-218.

UK Patent Application GB No. 2153954 A, published 29 Aug. 1985.

Primary Examiner—John J. Love
Assistant Examiner—Richard Lamby
Attorney, Agent, or Firm—Krass & Young

[57] ABSTRACT

A feedback system for controlling mechanical oscillations in the torsionally complaint drive train of an electric or other vehicle. Motor speed is converted in a processor to estimate state signals in which a plant model which are used to electronically modify the torque commands applied to the motor.

13 Claims, 3 Drawing Sheets

OSCILLATION CONTROL SYSTEM FOR ELECTRIC MOTOR DRIVE

GOVERNMENT RIGHTS STATEMENT

The United States government has rights to this invention pursuant to contract No. DE-ACO8-84NV10366 awarded by the U.S. Department of Energy.

INTRODUCTION

This invention relates to control systems for vehicle drive trains and more particularly to a control system which reduces low frequency mechanical oscillations due to torsional compliance in the drive train.

BACKGROUND OF THE INVENTION

Although research and development work on vehicle drive trains has gone on for several years, a problem of recent identification is the tendency of the mechanical drive train to respond to step function torque inputs in a low frequency oscillatory fashion. This response is due to the torsional compliance of the drive shaft or shafts and the tires which are mounted on the traction wheels of the vehicle. In combination, the components of the drive train exhibit sufficient "wind-up" and resonant capability as to produce an objectionable oscillatory response under some vehicle start-up, low speed, and gear shift conditions.

BRIEF SUMMARY OF THE INVENTION

We have found that it is possible to control and reduce the tendency of a drive train exhibiting torsional compliance to oscillate by equating input control commands to torque, monitoring a dynamic state of the driven load and developing feedback signals to modify the input torque commands.

Accordingly, a first aspect of our invention is an apparatus for use in combination with a drive comprising a controllable-output motive power source such as an electric motor, a traction wheel or wheels which, because of its load, exhibits substantial inertia, and a torque transmitting connection between the source and wheel wherein said connection and said wheel, in combination, exhibit sufficient torsional compliance to be susceptible of oscillatory dynamic responses to torque input. The apparatus comprises an input system connected to the source for producing torque commands, a sensor operatively associated with the wheel for producing a signal representing a dynamic state thereof, and feedback means connecting the sensor to the input means for modifying the torque commands in a direction which tends to reduce the oscillatory dynamic responses toward zero.

According to a second aspect of our invention, we have eliminated the need for utilizing an expensive and complex torque sensor in the drive train while at the same time preserving the benefits and advantages of utilizing torque as the controlled quantity. In general, this is accomplished in a system of the type described above, wherein the sensor means connected to the driven wheel produces a signal representing actual speed thereof, and a dynamic plant model or "estimator," running in real time and in parallel with the physical plant, receives the speed signal and derives one or more signal quantities representing estimated states of the drive train. The signal or signals from the model are utilized in a feedback system to modify torque inputs so as to reduce the oscillatory dynamic responses of the system toward zero.

In accordance with a still further aspect of our invention, the plant model or estimator is capable of producing as many as three estimated system state signals according to state space formulated difference equation algorithms, one of said signals being an estimation of drive shaft torque, and of utilizing all of the signals to modify the torque command and the various derivable components thereof under all conditions of vehicle operation. To achieve this, an integrator is used in the input command line to provide a "fourth state" signal by integrating the error between torque input command and the estimated torque. Still further aspects of the invention, including a process for reducing or eliminating oscillatory dynamic responses in vehicle drive trains, will be best appreciated by reading the following description of two illustrative embodiments of our invention.

DETAILED DESCRIPTION OF THE ILLUSTRATIVE EMBODIMENTS

Figure 1:
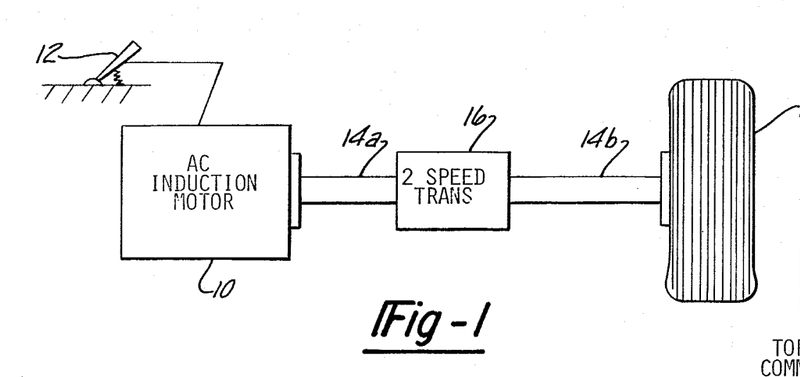
FIG. 1 is a simplified schematic drawing of a portion of a vehicle drive train wherein the motive power source is an ac induction motor.
Figure 2:
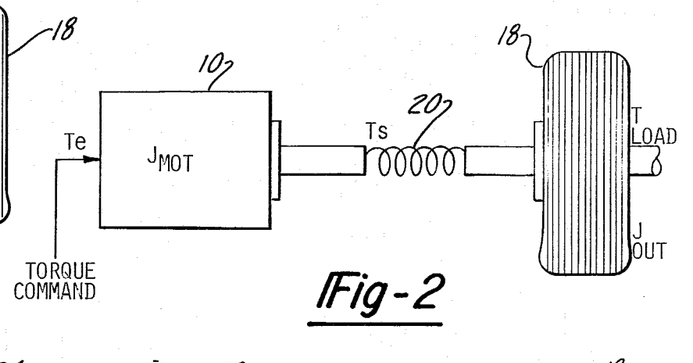
FIG. 2 is a schematic representation of the drive train of FIG. 1 emphasizing the torsional compliance thereof.

Referring now to FIGS. 1 and 2, representations of the actual structure and the analytical model of a system to which the invention is applied are shown. In FIG. 1, a motive power source 10 in the form of a high power, ac induction motor is connected to an accelerator pedal 12 which operates as a source of input torque commands, such commands being represented by motor current amplitude. The motor is connected by shafts 14a and 14b and a coupling 16 such as a two-speed transaxle to the traction wheel our wheels 18 of an electric powered vehicle, the mass of which imposes on inertial load on wheel 18. Coupling 16 is, for overall operating efficiency, a transmission of the mechanical lock-up type.

Some explanations and generalizations at this point are necessary to a full understanding of the following specification. The ac induction motor 10 is selected as the preferred motive power source on the basis of simplicity, cost and performance; i.e., the ac induction motor has no commutator and is not as speed-limited as a dc motor of corresponding horsepower. However, other types of motive power sources including i.c. engines, a.c. motors, permanent magnet (brushless dc) motors, and virtually any type of dc motor including the compound motor may be used in combination with the hereinafter described method and apparatus. The inertial load is represented here as a single traction wheel but it is to be understood that the invention is applicable to multiple-wheel drive systems as well.

The correlation of the position, i.e., relative amount of depression of accelerator pedal 12, with torque rather than speed is deliberate and an important aspect of the invention since it is torque control rather than speed control upon which the invention focuses. Moreover, the torque to pedal position correlation gives the vehicle incorporating the invention the characteristics of an internal combustion driven vehicle wherein cruising speed is achieved with a partially depressed pedal and additions or subtractions to the torque or power requirement for upgrades and downgrades are achieved, for example, by altering pedal position in the appropriate sense. Hand-operated accelerators and automatically programmed accelerator input systems are not excluded from use with the invention.

The mechanically locking two-speed transaxle 16 is simply representative of one suitable mechanical coupling for use in an ordinary road vehicle such as a delivery van or a commuter car. The lock-up feature has the important advantage of high efficiency but, as will hereinafter be made clear with reference to the characteristics schematic of FIG. 2, the two-speed transaxle actually contributes to the problem which is solved by and through the present invention.

At FIG. 2, the motive power source 10 is shown receiving torque commands and exhibits a motor inertia $J_{mot}$ and produces a torque $T_e$. The quantity $T_e$ is air gap torque which equals shaft torque $T_s$ only under steady state conditions. The traction wheel 18 is assumed to be an inflatable pneumatic tire having typical flexural characteristics or compliance when subjected to a torsional load $T_{load}$ which represents the inertial resistance of the vehicle to both positive and negative acceleration when a positive torque command is applied to the motive power source 10. The shaft 14a and the half shaft 14b of FIG. 1 are torsionally compliant and exhibit a measurable amount of wind-up when torque commands are applied and also when the vehicle is decelerating, the former being the focus of this description. The torsional wind-up characteristics of the drive train are represented, in sum, by the spring 20 which is shown in FIG. 2 as a theoretical characteristic of the drive train. The contributors to the windup characteristics are the shaft 14a, 14b, the transaxle 16 and the tire on wheel 18. If solid rubber or other tires of lesser flexural characteristics are used, then the spring quantity 20 represents the torsional compliance of the driveshafts in greater proportion, whereas if stiffer and shorter drive shaft components are used, then the spring 20 represents the tire flexure in greater proportion. In any event, these characteristics are straightforwardly estimable and susceptible of fairly precise determination.

Figure 3:
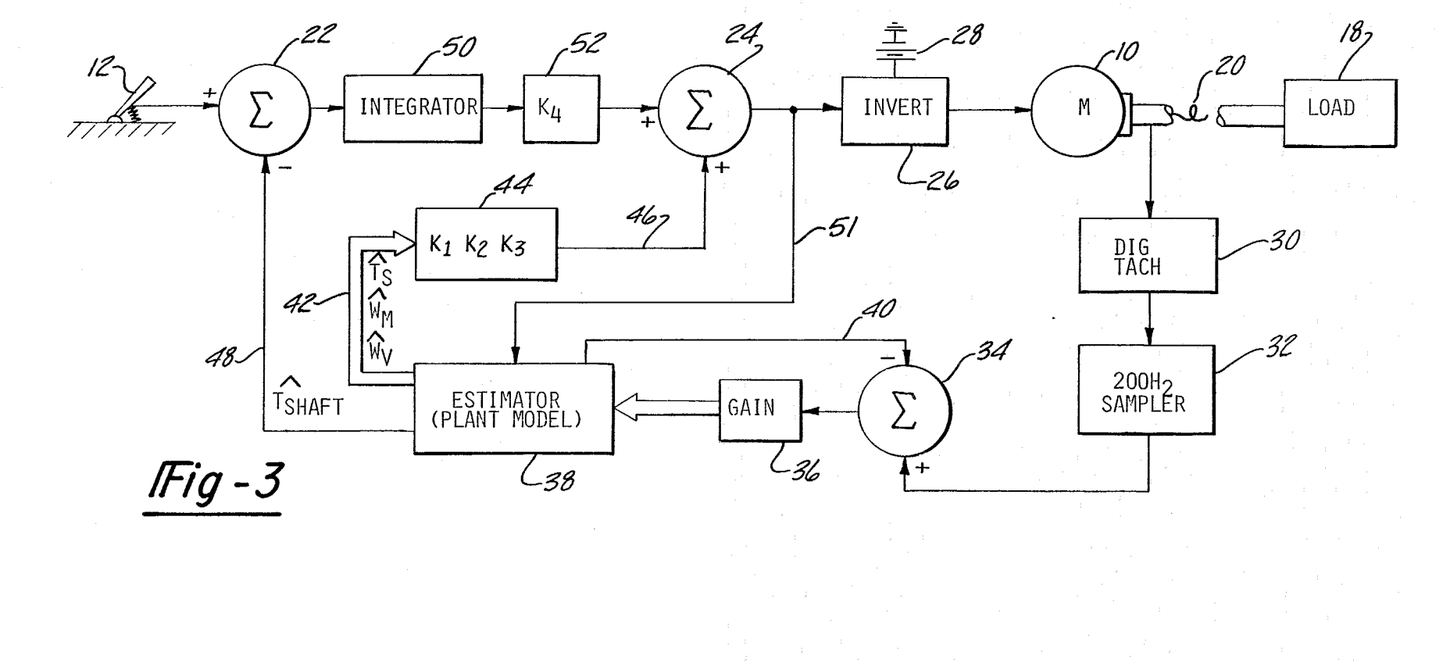
FIG. 3 is a schematic diagram of a first embodiment of the invention in an electronic feedback control system.

Looking now to FIG. 3, a schematic diagram of a control system incorporating the invention is disclosed. Again, the motive power source 10 is an ac induction motor and torque commands from accelerator 12 are generated by an operator. The motor 10 drives a load 18 through a drive system, the sum of the compliance of the drive system being represented by the spring 20. Again, the load and the drive system are assumed to represent a three- or a four-wheel vehicle having pneumatic tires, at least one drive wheel, and sufficient power to achieve normal road speeds.

The torque commands are applied to the motor 10 through serially connected summers 22 and 24 and a dc-to-ac inverter 26 which receives current from a bank of batteries represented collectively by reference numeral 28.

The speed of the output shaft of the motor 10 is sensed by digital tachometer 30 on a direct drive basis and applied through a 200 Hz sampler 32 as one input to a summer 34. The summer 34 generates an error signal representing the difference between measured shaft speed and an estimated speed signal on line 40. This error signal is applied via amplifier 36 to the real-time plant model or estimator 38 to generate a group of estimated signal quantities needed for system control purposes as hereinafter explained.

This vehicular control system implementation has numerous advantages. No torque sensors on running gear are required; no slip-ring connectors to convey electrical signals from rotating to stationary elements are required. The estimator 38 may be located within the vehicle where it is protected from potentially destructive environmental influences; finally, the estimator 38 provides a plant model which runs in real-time in parallel with the physical drive system and which is constantly driven toward a zero-error state by the feedback connection provided by line 40 and summer 34.

Briefly explaining the estimator, it is a set of algorithms or equations representing the determinable inertial or dynamic characteristics of the drive train shown in FIG. 1. As fundamental input, it receives the torque command from summer 24.

The estimator 38 produces output signals as follows:
$\hat{T}_s$ representing estimated shaft torque;
$\hat{w}_m$ representing estimated motor speed; and
$\hat{w}_v$ representing estimated vehicle speed.

These three signals are conveyed over lines 42 to amplifier 44 where three gain factors $K_1$, $K_2$ and $K_3$, are utilized in appropriate amplifiers or multipliers and the output signals represented in FIG. 3 by line 46 are collectively applied to the input of summer 24 to modify the torque command so as to reduce unstable, resonant oscillatory effects in the drive train.

In an actual system, it has been determined that the period of the oscillatory response of the drive train under consideration was on the order of 4 Hz and the 200 Hz sample rate of sampler 32 was selected to be well above 4 Hz.

The estimator 38 also conveys the estimated shaft torque signal over line 48 to the second input of summer 22 which is the first electronic element to directly receive the torque command from accelerator pedal 12. The estimated shaft torque is subtracted from the actual output torque command and the difference is applied to an integrator 50 which generates a signal suitable for summing with the signal on line 46 from the amplifier 44; i.e., only torque commands and shaft torque are available for summing, the torque control is inadequate and the speed factors go virtually unused. Amplified by gain factor $K_4$ in amplifier 52, the signal applied to the second input of summer 24 and the summed result becomes the control signal applied to the converter 26 which in turn delivers the actual current amplitude to the induction motor 10. This same control signal is applied over line 51 to the estimator 38 as an input for driving the estimator 38. Accordingly, the estimator 38 makes all determinations on the basis of the actual torque command and the actual measured speed. It has been found that these are sufficient data from which to derive accurate estimated signal quantities.

Figure 4:
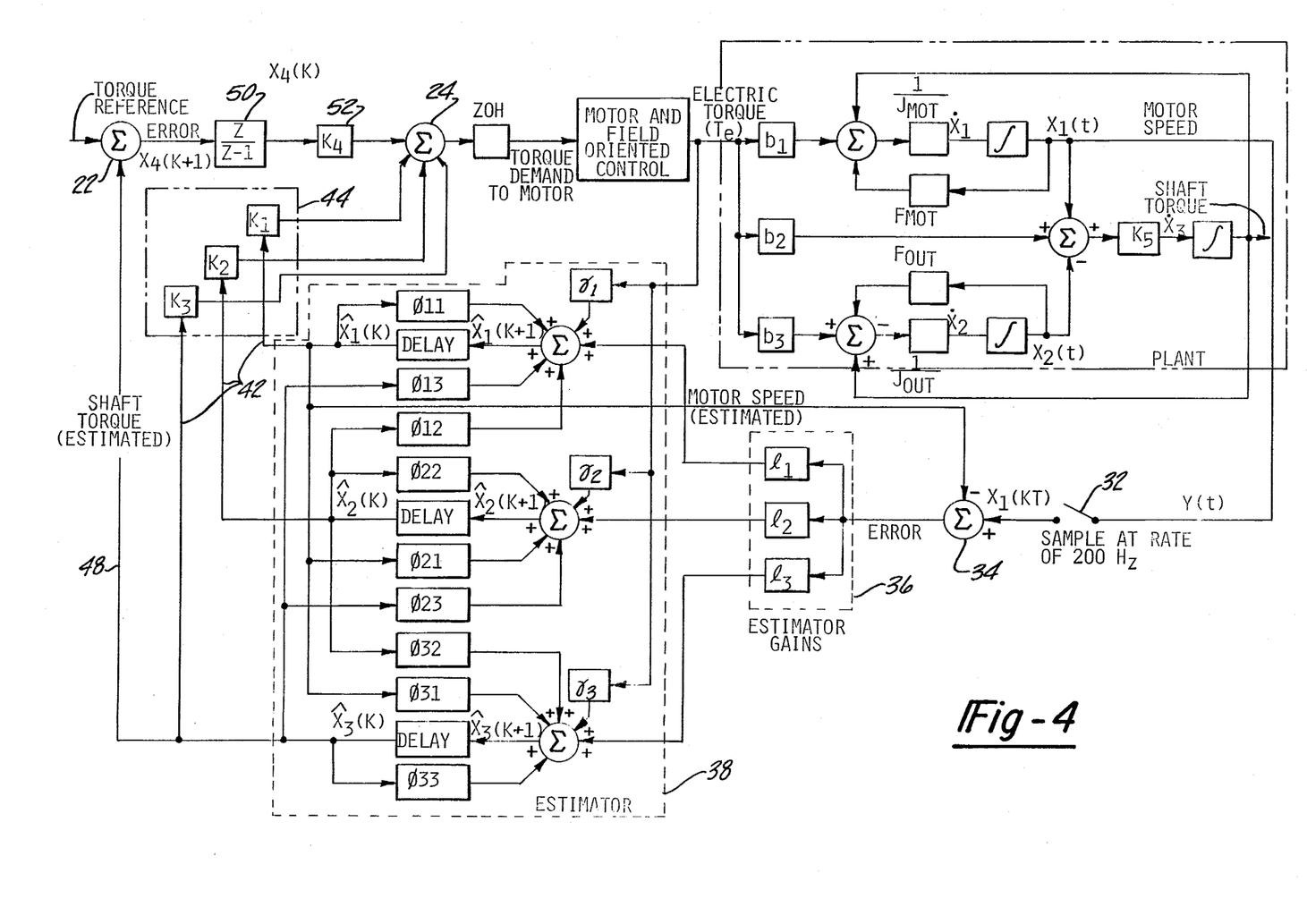
FIG. 4 is a more detailed schematic diagram of the embodiment of FIG. 3.

Looking now to FIG. 4, a mathematical model diagram corresponding generally with the system hardware diagram of FIG. 3 is given. Corresponding components are correspondingly numbered in the two figures.

In FIG. 4, the combination of the motor 10, coupling 20 and load 18 is termed the "Plant" and the mathematical model is shown. The "plant" equations in matrix form are:

$$\dot{x}(t) = Ax(t) + Bu(t)$$

$$y(t) = Cx(t)$$

(x-vector)
$$\begin{bmatrix} \dot{x}_1(t) \\ \dot{x}_2(t) \\ \dot{x}_3(t) \end{bmatrix} =$$

$$\begin{matrix} (\text{A term}) & (\text{x-vector}) & (\text{B term}) \end{matrix}$$

$$\begin{bmatrix} -\frac{Fmot}{Jmot} & 0 & -\frac{1}{Jmot} \\ 0 & -\frac{Fveh}{Jveh} & +\frac{1}{Jveh} \\ K_s & -K_s & 0 \end{bmatrix} \begin{bmatrix} x_1(t) \\ x_2(t) \\ x_3(t) \end{bmatrix} + \begin{bmatrix} \frac{1}{Jmot} \\ 0 \\ 0 \end{bmatrix} Te$$

$$y(t) = \begin{matrix} (\text{C term}) \\ [1\ 0\ 0] \end{matrix} \cdot \begin{bmatrix} x_1(t) \\ x_2(t) \\ x_3(t) \end{bmatrix}$$

where
Fmot = motor friction
Jmot = motor inertia
Fveh = load friction
Jveh = load inertia
Ks = overall spring coefficient
$x_1(t)$ = motor speed
$x_2(t)$ = load speed
$x_3(t)$ = shaft torque
$\dot{x}_1(t)$ = first time derivative of motor speed
$\dot{x}_2(t)$ = first time derivative of load speed
$\dot{x}_3(t)$ = first time derivative of shaft torque
y(t) = measured plant output = motor speed
because motor speed is sampled at 32:

$$y(t) \longrightarrow \boxed{\overset{32}{\text{sampler}}} \longrightarrow y(kT)$$

where T is the sampling time.

The estimator 38, also shown as a mathematical model has the following equations:

$$\hat{x}(K+1) = \phi\hat{x}(K) + \Gamma u(K) + L[y(k) - C\hat{x}(K)]$$

$$y(K) = Cx(K)$$

$$\begin{bmatrix} \hat{x}_1(k+1) \\ \hat{x}_2(k+1) \\ \hat{x}_3(k+1) \end{bmatrix} = \begin{bmatrix} \phi_{11} & \phi_{12} & \phi_{13} \\ \phi_{21} & \phi_{22} & \phi_{23} \\ \phi_{31} & \phi_{32} & \phi_{33} \end{bmatrix} \begin{bmatrix} \hat{x}_1(k) \\ \hat{x}_2(k) \\ \hat{x}_3(k) \end{bmatrix} +$$

$$\begin{bmatrix} \gamma_1 \\ \gamma_2 \\ \gamma_3 \end{bmatrix} \cdot Te + \begin{bmatrix} l_1 \\ l_2 \\ l_3 \end{bmatrix} \cdot \left[ y(k) - \begin{matrix} (\text{C-term}) \\ [1\ 0\ 0] \end{matrix} \cdot \begin{bmatrix} \hat{x}_1(k) \\ \hat{x}_2(k) \\ \hat{x}_3(k) \end{bmatrix} \right]$$

For simplicity the letter k has been substituted for kT and is interpreted as the value of time, t, at t = kT. Thus, k+1 is taken to be time, t, at t = (k+1)T.

The sum of the control equations are:

$$Te = k_1\hat{x}_1(k) + k_2\hat{x}_2(k) + k_3x_3(k) + k_4\hat{x}_4(k)$$

$$\hat{x}_4(k+1) = \hat{x}_4(k) + T(T_{ref} - \hat{x}_3(k))$$

The actual programs for the estimator 38 and the controller, comprising summers 22 and 24, integrator 50 and amplifiers 44 and 52 are listed at the end of this specification.

Figure 5:
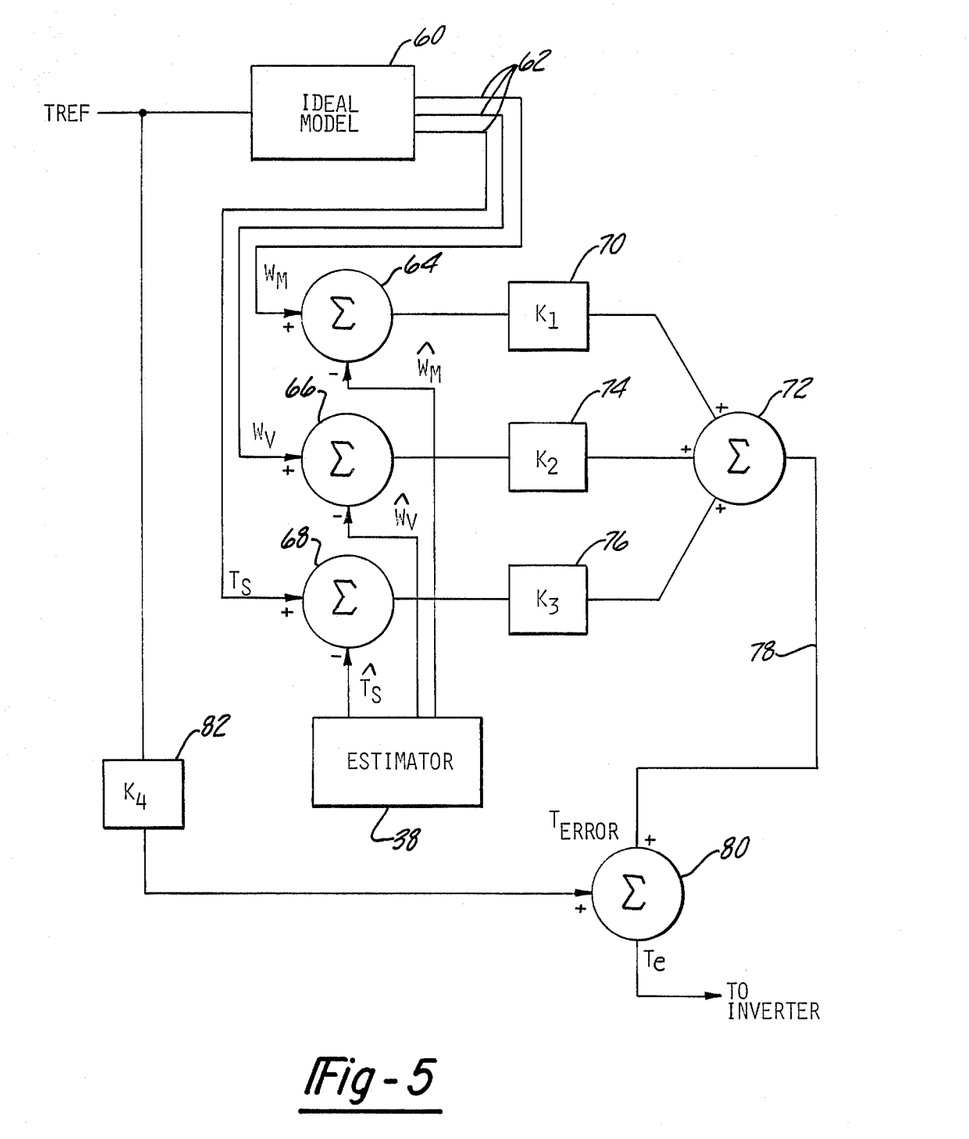
FIG. 5 is a schematic diagram of a portion of a second embodiment of the invention in a vehicle drive control system.

Referring now to FIG. 5, an alternative embodiment of the control system of FIG. 3 is illustrated. In this embodiment, the electrical torque or "air gap" torque of the motor is the setpoint quantity as opposed to the output shaft torque of the embodiment of FIG. 3. Electrical torque is somewhat higher than shaft torque and it is theoretically possible in the system of FIG. 3 that a given shaft torque error might call for an electrical output torque from the motor 10 which the physical characteristics of the motor cannot achieve. Under these circumstances, the loss of control would be suffered.

In the embodiment of FIG. 5, the torque input command is applied to an ideal model 60 which, like the estimator 38, resides in software programmed into a conventional microprocessor such as an Intel 8096 representing the physical characteristics of the drive line but with the assumption of no torsional compliance or "spring." The model 60 produces three outputs on lines 62 representing the motor speed, vehicle speed and shaft torque of the idealized physical model. These signals are applied to the first inputs of summers 64, 66 and 68, respectively. The second inputs to each of the summers are received from the estimator 38 which is identical to the estimator in the system of FIG. 3 and which produces signals representing estimated motor speed, vehicle speed and shaft torque; these signals are applied to the second inputs of the summers 64, 66 and 68, respectively, as shown. Three error signals which result are amplified by gain factors $K_1$, $K_2$ and $K_3$ in amplifiers 70, 74 and 76, respectively, and applied to respective of a summer 72. The output of the summer 72 is applied via line 78 as a three-component torque error signal to a summer 80. The second signal to summer 80 is a gain control (amplifier 82) version of the torque command and is utilized because all three of the torque error signals applied to summer 72 go to zero under steady state conditions; accordingly, the output of amplifier 82 becomes the constant of torque or "cruise" signal under steady state conditions. The output of summer 80 is the torque signal as applied to inverter 26 in the system of FIG. 3. The systems are otherwise identical.

```
ESTIM: DO:
/****************************************************************
*                                                                *
*       THIS PROCEDURE PERFORMS THE ESTIMATION ALGORITHM FOR     *
*       ESTIMATION OF THE THREE STATES OF THE TWO MASS SPRING    *
*       SYSTEM.                                                  *
*                                                                *
*       PROGRAM INPUTS:     X1 - MOTOR SPEED                     *
*                           TE - MOTOR TORQUE                    *
*                                                                *
*       PROGRAM OUTPUTS:    X1HAT - ESTIMATE OF MOTOR SPEED      *
*                           X2HAT - ESTIMATE OF SPEED OF EXTERNAL INERTIA *
*                           X3HAT - ESTIMATE OF SPRING TORQUE    *
*                                                                *
*       PROCEDURE: THE FOLLOWING EQUATIONS ARE SOLVED.           *
*                                                                *
x1hat(n+1) = phi11*x1hat(n) + phi12*x2hat(n) + phi13*x3hat(n) + gam1*u(n)
         +l1*y x2hat(n+1) = phi21*x1hat(n) + phi22*x2hat(n) + phi23*x3hat(n) + gam2*u(n)

+l2*y x3hat(n+1) = phi31*x1hat(n) + phi32*x2hat(n) + phi33*x3hat(n) + gam3*u(n)

+l3*y
*****************************************************************/

DECLARE PHI11 LITERALLY '447';  /* 11 ELEMENT OF OBSERVER STATE MATRIX */
DECLARE PHI12 LITERALLY '9';    /* 12 ELEMENT OF OBSERVER STATE MATRIX */
DECLARE PHI13 LITERALLY '-32-'; /* 13 ELEMENT OF OBSERVER STATE MATRIX */
DECLARE PHI21 LITERALLY '-280-';/* 21 ELEMENT OF OBSERVER STATE MATRIX */
DECLARE PHI22 LITERALLY '1021'; /* 22 ELEMENT OF OBSERVER STATE MATRIX */
DECLARE PHI23 LITERALLY '11';   /* 23 ELEMENT OF OBSERVER STATE MATRIX */
DECLARE PHI31 LITERALLY '1758'; /* 31 ELEMENT OF OBSERVER STATE MATRIX */
DECLARE PHI33 LITERALLY '-556'; /* 32 ELEMENT OF OBSERVER STATE MATRIX */
DECLARE GAM1 LITERALLY '32' ;   /* 11 ELEMENT OF SYSTEM INPUT MATRIX */
DECLARE GAM2 LITERALLY '0';     /* 21 ELEMENT OF SYSTEM INPUT MATRIX */
DECLARE GAM3 LITERALLY '9';     /* 31 ELEMENT OF SYSTEM INPUT MATRIX */
DECLARE L1 LITERALLY '567';     /* OBSERVER GAIN L1 */
DECLARE L2 LITERALLY '283';     /* OBSERVER GAIN L2 */
DECLARE L3 LITERALLY '-1202';   /* OBSERVER GAIN L3 */
DECLARE X1HATMAX  LITERALLY '1000H'; /* MAXIMUM ALLOWABLE ESTIMATED MOTOR
SPEED */
DECLARE X2HATMAX LITERALLY '1000H'; /* MAXIMUM ALLOWABLE ESTIMATED EXTERNAL
INERTIA SPEED */
DECLARE X3HATMAX LITERALLY '1000H'; /* MAXIMUM ALLOWABLE ESTIMATED SPRING
TORQUE */

DECLARE KSPEED LITERALLY '1AAAH'; /* CONSTANT USED TO CALCULATE ROTOR SPEED
                                     FROM POSITION DATA */
DECLARE TORQUE INTEGER PUBLIC FAST; /* MOTOR TORQUE = I_TORQUE*I_FIELD
                                     * 1PU / BASE_FIELD */
DECLARE I_TORQUE INTEGER EXTERNAL; /* MOTOR TORQUE, SYSTEM INPUT, U, 1PU =
                                     1024 */
DECLARE BASE_FIELD_CURRENT INTEGER EXTERNAL;
DECLARE FLUX_CURRENT INTEGER EXTERNAL;

DECLARE ONE_PER_U  LITERALLY '1024';
DECLARE I_TORQUE_LIMIT INTEGER EXTERNAL; /* MAXIMUM ALLOWABLE TORQUE
CURRENT */
DECLARE SPEED INTEGER PUBLIC FAST; /* ROTOR SPEED, SYSTEM OUTPUT 1PU = 1024 */
DECLARE X1HAT INTEGER PUBLIC FAST; /* ESTIMATE OF ROTOR SPEED 1PU = 1024 */
DECLARE X2HAT INTEGER PUBLIC FAST; /* ESTIMATE OF EXTERNAL INERTIA SPEED 1PU =
                                     1024 */
```

```
DECLARE X3HAT INTEGER PUBLIC FAST; /* ESTIMATE OF SPRING TORQUE 1PU - 1024 */
DECLARE X1HATM1 INTEGER FAST; /* LAST ESTIMATE OF ROTOR SPEED */
DECLARE X2HATM1 INTEGER FAST; /* LAST ESTIMATE OF EXTERNAL INERTIA SPEED */
DECLARE X3HATM1 INTEGER FAST; /* LAST ESTIMATE OF EXTERNAL INERTIA SPEED */
DECLARE ROTOR_POSITION INTEGER EXTERNAL; /* 1 CYCLE = 1024 */
DECLARE OLD_ROTOR_POSITION INTEGER FAST; /* 1 CYCLE = 1024 */
DECLARE SLM1 INTEGER EXTERNAL; /* INPUT TO MULTIPLY PROCEDURE */
DECLARE SLM2 INTEGER EXTERNAL; /* INPUT TO MULTIPLE PROCEDURE */
DECLARE SLMA LONGINT EXTERNAL;/*OUTPUT OF MULTIPLY PROCEDURE */
DECLARE SLMA1 INTEGER EXTERNAL; /* OUTPUT OF DIVIDE ROUTINE */
DECLARE SLMA2 INTEGER EXTERNAL; /* [B REMAINDER OF DIVIDE ROUTINE */
DECLARE TMP LONGINT FAST;
LMULS:  PROCEDURE EXTERNAL;
END LMULS;

LDIVS:  PROCEDURE EXTERNAL;
END LDIVS;
ESTIM:  PROCEDURE PUBLIC;

/* CALCULATE MOTOR ANGULAR VELOCITY */
/* SPEED = (ROTOR_POSITION - OLD_ROTOR_POSITION) * KSPEED; */
/* ROTOR POSITION = 1024 BITS/ REV, KSPEED = (1024/(1024*(BASE
FREQ)*.005))*1024 */
/* BASE FREQUENCY = 30HZ, SO AT 1024 PULSES/REV, EXPECT 153.6 PULSES IN .005
SEC AT BASE SPEED. TO GET BASE SPEED = 1024, MULTIPLY BY 6.67. TO PUT HEX
POINT AT 1024 MULTIPLY AGAIN BY 1024. THIS GIVES SPEED IN HEX AT 400H = 1.0
PER UNIT */

SLM1 = (ROTOR_POSITION - OLD_ROTOR_POSITION);
OLD_ROTOR_POSITION = OLD_ROTOR_POSITION + SLM1;
SLM2 = KSPEED;
CALL LMULS;
SPEED = SLMA/1024;

/* CALCULATE X1HAT */
/* ALL INPUTS TO ESTIMATOR ARE IN UNITS OF 1024 = 1 PER UNIT */
/* ALL CONSTANTS ARE TIMES 1024 SO AN IMPLIED HEXADECIMAL POINT IS AT .400H */
/* THE ESTIMATOR OUTPUTS MUST BE DIVIDED BY 1024 TO PUT THEM BACK TO 1 PER UNIT
= 1024 */

X1HATM1 = X1HAT;
SLM1 = PHI11;
SLM2 = X1HAT;
CALL LMULS;
TMP = SLMA;
SLM1 = PHI12;
SLM2 = X2HAT;
CALL LMULS;
TMP = TMP + SLMA;
SLM1 = PHI13;
SLM2 = X3HAT;
CALL LMULS;
TMP = TMP + SLMA;
SLM1 = GAM1;
SLM2 = I_TORQUE;
CALL LMULS;
TMP = TMP + SLMA;
SLM1 = L1;
SLM2 - SPEED;
CALL LMULS;
TMP = (TMP + SLMA_/1024;
IF IABS(TMP)   X1HATMAX THEN
        X1HAT = SHORT(TMP);
ELSE IF TMP   0 THEN
        X1HAT = X1HATMAX;
```

```
    ELSE
        X1HAT = X1HATMAX;

/* CALCULATE X2HAT */

X2HATM1 = X2HAT;
SLM1 = PHI21;
SLM2 = X1HATM1;
CALL LMULS;
TMP = SLMA;
SLM1 = PHI22;
SLM2 = X2HATM1;
CALL LMULS;
TMP = TMP + SLMA;
SLM1 = PHI23;
SLM2 = X3HAT;
CALL LMULS;
TMP = TMP + SLMA;
SLM1 = L2;
SLM2 = SPEED;
CALL LMULS;
TMP = (TMP + SLMA)/1024;

/* COMPARE LIMITS */

IF IABS(TMP)   X2HATMAX THEN
        X2HAT = SHORT(TMP);
ELSE IF TMP   0 THEN
        X2HAT = -X2HATMAX;
    ELSE
        X2HAT = X2HATMAX;

/* CALCULATE X3HAT */

X3HATM1 = X3HAT;
SLM1 = PHI31;
SLM2 - X1HATM1;
CALL LMULS;
TMP = SLMA;
SLM1 = PHI32;
SLM2 - X2HATM1;
CALL LMULS;
TMP = TMP + SLMA;
SLM1 = PHI33;
SLM2 - X3HATM1;
CALL LMULS;
TMP = TMP + SLMA;
SLM1 = GAM3;
SLM2 = I_TORQUE;
CALL LMULS;
TMP = TMP + SLMA;
SLM1 = L3;
SLM2 = SPEED;
CALL LMULS;
TMP = (TMP = SLMA)/1024;

/* COMPARE LIMITS */

IF IABS (TMP)   I_TORQUE_LIMIT THEN
        X3HAT = SHORT (TMP);
ELSE IF TMP   0 THEN
        X3HAT = -I_TORQUE_LIMIT;
    ELSE
        X3HAT = I_TORQUE-LIMIT;
END;
END;
```

```
CONTRL: DO;
/****************************************************************
*                                                                *
* THIS PROCEDURE PERFORMS THE CONTROL ALGORITHM FOR              *
* CONTROL OF A TWO MASS SPRING SYSTEM,                           *
*                                                                *
* PROGRAM INPUTS: X1HAT - ESTIMATE OF MOTOR SPEED                *
*                 X2HAT - ESTIMATE OF EXTERNAL INERTIA SPEED     *
*                 X3HAT - ESTIMATE OF SPRING TORQUE              *
*                 TREF  - SPRING TORQUE REFERENCE                *
*                                                                *
* PROGRAM OUTPUTS: I_TORQUE - MOTOR ELECTRICAL TORQUE            *
*                                                                *
* PROCEDURE: THE PROGRAM FIRST CREATES A FOURTH STATE, WHICH     *
*            IS THE OUTPUT OF AN INTEGRATOR WHOSE INPUTS ARE     *
*            (TREF - X3HAT), THEN THE STATE VECTOR (FOURTH       *
*            ORDER) IS MULPLIED BY A 1*4 GAIN MATRIX TO OBTAIN   *
*            THE ELECTRICAL TORQUE, THE FOLLOWING EQUATIONS      *
*            ARE SOLVED:                                         *
*                                                                *
* 1) INTEGRATE SPRING TORQUE ERROR -                             *
*         X4 = X4M1 + (TREF - X3HAT)*T                           *
*                                                                *
* 2) CALCULATE ELECTRICAL TORQUE -                               *
*         I_TORQUE = K1*X1HAT + K2*X2HAT + K3*X3HAT + K4*X4      *
*                                                                *
*****************************************************************/
```

| | | |
|---|---|---|
| 2 | 1 | DECLARE X4 LONGINT PUBLIC FAST; /* OUTPUT OF TORQUE ERROR INTEGRATOR*/ |
| 3 | 1 | DECLARE X4MAX LITERALLY '100000H'; /* MAXIMYM ALLOWABLE TORQUE ERROR */ |
| 4 | 1 | DECLARE X4M1 LONGINT FAST; /* PREVIOUS VALUE OF X4 */ |
| | | /* DECLARE TREF INTEGER FAST; /* SPRING TORQUE REFERENCE */ |
| 5 | 1 | DECLARE SPEED_DEMAND INTEGER EXTERNAL; /* USED AS THE TORQUE REFERENCE IN ORDER TO INTERFACE WITH EXISTING PROGRAM ONPOWER LAB CONTROLLER */ |
| 6 | 1 | DECLARE X1HAT INTEGER EXTERNAL; /* ESTIMATE OF MOTOR SPEED */ |
| 7 | 1 | DECLARE X2HAT INTEGER EXTERNAL; /* ESTIMATE OF INERTIA SPEED */ |
| 8 | 1 | DECLARE X3HAT INTEGER EXTERNAL; /* ESTIMATE OF SPRING TORQUE */ |
| 9 | 1 | DECLARE I_TORQUE INTEGER EXTERNAL; /* TORQUE COMPONENT OF MOTOR CURRENT */ |
| 10 | 1 | DECLARE TMP LONGINT FAST; /* TEMPORARY STORAGE */ |
| 11 | 1 | DECLARE TPERIOD LITERALLY '0005'; /* CONTROLLER SAMPLE RATE = .005 SEC @ 1SEC = 1024 */ |
| 12 | 1 | DECLARE K1 LITERALLY '-1091'; /* CONTROLLER GAIN K1 */ |
| 13 | 1 | DECLARE K2 LITERALLY '-1063'; /* CONTROLLER GAIN K2 */ |
| 14 | 1 | DECLARE K3 LITERALLY '-495'; /* CONTROLLER GAIN K3 */ |
| 15 | 1 | DECLARE K4 LITERALLY '14580'; /* CONTROLLER GAIN K4 */ |
| 16 | 1 | DECLARE I_TORQUE_LIMIT INTEGER EXTERNAL; /* MAXIMUM ALLOWABLE TORQUE */ |
| 17 | 1 | DECLARE SLM1 INTEGER EXTERNAL; /* INPUT TO MULTIPLY PROCEDURE */ |
| 18 | 1 | DECLARE SLM2 INTEGER EXTERNAL; /* INPUT TO MULTIPLY PROCEDURE */ |
| 19 | 1 | DECLARE SLMA LONGINT EXTERNAL; /* OUTPUT OF MULTIPLY PROCEDURE */ |
| 20 | 1 | LMULS: PROCEDURE EXTERNAL; |
| 21 | 2 | END LMULS; |
| 22 | 1 | CONTRL: PROCEDURE PUBLIC; |
| | | /* INTEGRATE TORQUE ERROR */ |
| 23 | 2 | SLM1 = TPERIOD; |
| 24 | 2 | SLM2 = (TREF - X3HAT); |
| 25 | 2 | CALL LMULS; |
| 26 | 2 | TMP = (X4 + SLMA); |
| 27 | 2 | IF IABS(TMP) < X4MAX THEN |
| 28 | 2 |     X4 = TMP; |
| 29 | 2 |     ELSE |
| | |     IF TMP > 0 THEN |
| 30 | 2 |     X4 = X4MAX; |
| 31 | 2 |     ELSE   X4 = -X4MAX; |

```
                /* CALCULATE ELECTRICAL TORQUE */

/* I_TORQUE = K1*X1HAT + K2*X2HAT + K3*X3HAT + K4*X4 */

/* ALL K'S ARE SCALED ON A BASE OF 64, THUS, THE K AS DEFINED
                   ABOVE IS 64 TIMES THE REAL K. THE RESULTING ELECTRICAL TORQUE
                   IS THEN DIVIDED BY 64 IN ORDER TO RECOVER THE SCALING.
                   ELECTRICAL TORQUE IS SCALED AT 1.0 PER UNIT = 1024 AS ARE ALL
                   THE XHAT'S. */

32    2         SLM1 = K1;
33    2         SLM2 = X1HAT;
34    2         CALL LMULS;
35    2         TMP = SLMA;
36    2         SLM1 = K2;
37    2         SLM2 = X2HAT;
38    2         CALL LMULS;
39    2         TMP = TMP + SLMA;
40    2         SLM1 = K3;
41    2         SLM2 = X3HAT;
42    2         CALL LMULS;
43    2         TMP = TMP + SLMA;
44    2         SLM1 = K4;
45    2         SLM2 = X4/1024;
46    2         CALL LMULS;
47    2         TMP = (TMP + SLMA)/64;
48    2           IF IABS(TMP) < I_TORQUE_LIMIT THEN
49    2               I_TORQUE = SHORT (TMP);
50    2           ELSE
                    IF TMP < 0 THEN
51    2                 I_TORQUE = -I_TORQUE_LIMIT;
52    2           ELSE
                        I_TORQUE = I_TORQUE_LIMIT;
53    2         END;
54    1     END;
```

We claim:

1. In combination with a drive comprising a controllable-output motive power source, at least one inertially-loaded traction wheel, and a torque-transmitting connection between the source and wheel, said connection and said wheel, in sum, exhibiting a torsional compliance susceptible of oscillatory dynamic responses to torque inputs:

input means connected to said source for producing torque commands;

sensor means for producing a signal representing an actual state of said drive; and     feedback means responsive to said signal for modifying said torque commands to reduce said oscillatory dynamic responses toward zero.

2. Apparatus as defined in claim 1 wherein said state is speed.

3. In combination with a drive comprising a controllable-output motive power source, at least one inertially loaded vehicle traction wheel, and a torque-transmitting connection between the source and wheel, said connection and said wheel, in combination, exhibiting a torsional compliance susceptible of oscillatory dynamic responses to torque inputs:

(a) input means connected to said source for producing torque commands;

(b) sensor means connected to said source for producing a signal representing actual speed thereof;

(c) programmable processor estimator means representing a model of said drive connected to receive said signal for deriving a signal representing estimated torque transmitted to the load by said connection; and     (d) feedback means connected to receive said estimated torque signal for modifying said torque commands to reduce said oscillatory dynamic responses toward zero.

4. Apparatus according to claim 3 wherein said estimator means comprises:

means for producing signals representing estimated source speed, estimated load speed, and estimated transmitted torque.

5. Apparatus according to claim 3 wherein said source is an electric motor.

6. Apparatus according to claim 5 wherein said electric motor is an induction motor.

7. Apparatus according to claim 5 further including a battery and an inverter connected to said battery to convert direct current therefrom to alternating current for application to said motor.

8. Apparatus according to claim 3 wherein said fourth means includes an integrator.

9. A method of controlling the torque produced by a motor in response to a torque change command wherein said motor is connected to a high-inertia load, such as a vehicle traction wheel, through a torsionally compliant coupling which as a result of torsional windup and release is susceptible of oscillatory dynamic response to said torque comprising the steps of:
producing a torque command;
measuring the actual speed of the motor;
generating from said actual speed an estimate in a plant model of the torque transmitted by said coupling; and
mixing the estimated torque with the torque command to produce an error signal which is applied to the motor to attenuate the oscillation.

10. A method of controlling the torque produced by a motor in response to a torque change command wherein said motor is connected to a high-inertia load, such as a vehicle traction wheel, through a torsionally compliant coupling which as a result of torsional windup and release is susceptible of oscillatory dynamic response to said torque comprising the steps of:
producing a torque command;
measuring a state of the motor;
generating from said state an estimate of the torque transmitted via said coupling;
summing the torque estimate with the torque command to produce a torque error;
integrating the torque error;
summing the integrated error with a proportioned sum of estimated system states to produce a command error; and
applying said command error to the motor as a torque control quantity to attenuate the oscillation.

11. In combination with a drive comprising a controllable-output motive power source, at least one inertially-loaded traction wheel, and a torque-transmitting connection between the source and wheel, said connection and said wheel, in combination, exhibiting a torsional compliance susceptible of oscillatory dynamic responses to torque inputs:
input means connected to said source for producing torque commands;
sensor means for producing a signal representing an actual state of said drive;
estimator means representing a model of said drive, said estimator means being connected to receive said actual state signal for producing in real-time and in parallel with said drive a plurality of estimated drive state signal quantities; and
feedback means responsive to said estimated state signal quantities for modifying said torque commands to reduce said oscillatory dynamic responses toward zero.

12. A vehicle drive system comprising a controllable motive power source having a rotary output member, at least one inertially loaded traction wheel and a torque transmitting connection between the rotary output member and the wheel, said connection and said wheel in combination exhibiting a torsional compliance susceptible of oscillatory dynamic responses to torque inputs comprising:
means for generating torque commands and applying said torque commands to said source;
estimator means representing a model of the drive and responsive to an instantaneous state input to generate signals representing instantaneous operating parameters of the drive;
transducer means associated with said drive for producing a signal representing instantaneous state;
means for connecting said transducer to said estimator means for producing an estimated torque signal; and
feedback means for summing said estimated torque signal with said torque commands for modifying the inputs to said source to avoid operating conditions corresponding to oscillatory dynamic responses in said drive.

13. Apparatus as defined in claim 12 wherein said state is speed.

* * * * *